US011979708B2

(12) United States Patent
Feng et al.

(10) Patent No.: US 11,979,708 B2
(45) Date of Patent: May 7, 2024

(54) LINEAR MOVEMENT BISTABLE ELECTROMAGNETIC SWITCH

(71) Applicant: CHUANDONG MAGNETIC ELECTRONICS CO., LTD., Foshan (CN)

(72) Inventors: Li Feng, Foshan (CN); Tao Yan, Foshan (CN); Tianbao Yan, Foshan (CN)

(73) Assignee: Chuandong Magnetic Electronics Co., Ltd. (CN)

(*) Notice: Subject to any disclaimer, the term of this patent is extended or adjusted under 35 U.S.C. 154(b) by 838 days.

(21) Appl. No.: 16/323,327

(22) PCT Filed: Jun. 19, 2017

(86) PCT No.: PCT/CN2017/088936
§ 371 (c)(1),
(2) Date: Jul. 21, 2021

(87) PCT Pub. No.: WO2018/205353
PCT Pub. Date: Nov. 15, 2018

(65) Prior Publication Data

US 2021/0352400 A1 Nov. 11, 2021

(30) Foreign Application Priority Data

May 8, 2017 (CN) ......................... 201710316824.3

(51) Int. Cl.
*H04R 1/28* (2006.01)
*H01F 7/08* (2006.01)
(Continued)

(52) U.S. Cl.
CPC ........... *H04R 1/2888* (2013.01); *H01F 7/081* (2013.01); *H04R 1/025* (2013.01); *H04R 9/025* (2013.01); *H04R 9/06* (2013.01); *H04R 2499/11* (2013.01)

(58) Field of Classification Search
CPC ...... H04R 1/2888; H04R 1/025; H04R 9/025; H04R 9/06; H04R 2499/11; H04R 1/2826;
(Continued)

(56) References Cited

U.S. PATENT DOCUMENTS

2001/0022844 A1* 9/2001 Urushibata ............ H04R 9/046 381/318
2011/0311091 A1* 12/2011 Nagumo ................ H04R 11/02 381/398
2012/0008814 A1* 1/2012 Alwicker ............ H04R 1/1058 29/896.2

FOREIGN PATENT DOCUMENTS

JP 2005158711 A * 6/2005 ......... H01H 51/2209
RU 112499 U1 * 1/2012

* cited by examiner

*Primary Examiner* — Carolyn R Edwards
*Assistant Examiner* — Julie X Dang

(57) ABSTRACT

A linear movement bistable electromagnetic switch, comprising a coil (1), a magnetic rotor (2) movably disposed in an inner hole of the coil (1), a shell (3) which wraps an outer side surface of the coil (1), and an insulating layer (4) disposed between the coil (1) and the shell (3). The magnetic rotor (2) is able to move under the effect of a magnetic field generated after the coil is energized; one end of the magnetic rotor (2) extends out of the coil (1) and is connected to a blocking piece (211) for opening/closing a loudspeaker leakage hole. The magnetic rotor is able to be extended or retracted by changing the direction of current in the coil so as to drive the blocking piece to block or open the leakage
(Continued)

hole, such that the call distortion condition can be improved and the high-frequency sound effect will not be reduced.

13 Claims, 3 Drawing Sheets

(51) Int. Cl.
*H04R 1/02* (2006.01)
*H04R 9/02* (2006.01)
*H04R 9/06* (2006.01)

(58) Field of Classification Search
CPC ..... H04R 2400/11; H04R 1/225; H01F 7/081; H01F 7/1615; H01F 2007/1669; H05K 2201/10053; H01R 13/713; H04Q 2213/063; H01H 71/24; H01J 37/141; H01J 2229/8636; H01J 2329/869
See application file for complete search history.

LINEAR MOVEMENT BISTABLE ELECTROMAGNETIC SWITCH

TECHNICAL FIELD OF THE INVENTION

The present invention relates to the technical field of electromagnetic switches, and more particularly, to a linear movement bistable electromagnetic switch.

BACKGROUND OF THE INVENTION

In the prior art, certain mobile phones sold on the market are equipped with two loudspeakers for achieving a surround-sound effect, wherein a loudspeaker arranged on one side is used for replacing the phone receiver. When a call begins, the power of the loudspeaker is reduced through circuit switching, thereby reducing the volume to a level that can be heard close to the ear. However, in order to prevent the call from being distorted, the effective frequency of a common phone receiver is at a low frequency ranging from 300-400 Hz. In such a frequency range, a serious distortion of the loudspeaker occurs during the call. Although a leakage hole is designed in the sound cavity of the loudspeaker in some technical solutions for improving the low-frequency call distortion condition, the high-frequency sound effect is inevitably sacrificed.

In conclusion, the shortcomings of the prior art are urgent problems that need to be solved for those skilled in this field.

SUMMARY OF THE INVENTION

The purpose of the present invention is to solve the shortcomings in the prior art by providing a linear movement bistable electromagnetic switch, through which the opening/closing of the leakage hole can be achieved according to a multimedia mode or a talk mode. Thus, the call distortion condition can be improved and the high-frequency sound effect will not be reduced.

To achieve the above purpose, the present invention adopts the following technical solution:

A linear movement bistable electromagnetic switch, comprising a coil, a magnetic rotor movably disposed in an inner hole of the coil, a shell which wraps an outer side surface of the coil, and an insulating layer disposed between the coil and the shell; the magnetic rotor is able to move under the effect of a magnetic field generated after the coil is energized; one end of the magnetic rotor extends out of the coil and is connected to a blocking piece for opening/closing a loudspeaker leakage hole.

In another aspect of the present invention, the shell comprises a base iron sheet and a metal half-shell connected with the base iron sheet. The two ends of the base iron sheet are respectively provided with a first folding edge and a second folding edge that are perpendicular to the moving direction of the magnetic rotor. Gaps are formed between the first folding edge and the two ends of the magnetic rotor, and between the second folding edge and the two ends of the magnetic rotor. A through hole is formed in the second folding edge close to the blocking piece.

In another aspect of the present invention, the magnetic rotor comprises a magnet fixing base that is provided with a fixing groove, and two permanent magnets that are installed in the fixing groove and face each other with the same pole. A shielding block is connected between the two permanent magnets, and the blocking piece is fixed at one end of the magnet fixing base.

In another aspect of the present invention, the material of the shielding block is iron.

In another aspect of the present invention, a sealing pad is arranged on the blocking piece.

In another aspect of the present invention, a gap not greater than 0.05 mm is formed between the magnetic rotor and the inner hole wall of the coil.

In another aspect of the present invention, when the magnetic rotor retracts, the distance between the blocking piece and the second folding edge is 0.5-2 mm.

In another aspect of the present invention, a plurality of fixing folding pieces is arranged at the two ends of the metal half-shell.

In another aspect of the present invention, the insulating layer is an insulating paper.

In another aspect of the present invention, the positions located on the two sides of the root of the first folding edge on the base iron sheet are respectively provided with a pin positioning ring for fixing a coil pin.

Compared with the prior art, the present invention has the following advantages:

The present invention provides a linear movement bistable electromagnetic switch, which comprises a coil, a magnetic rotor movably disposed in an inner hole of the coil, a shell which wraps an outer side surface of the coil, and an insulating layer disposed between the coil and the shell. The magnetic rotor is able to move under the effect of a magnetic field generated after the coil is energized. One end of the magnetic rotor extends out of the coil and is connected to a blocking piece for opening/closing a loudspeaker leakage hole. The magnetic rotor is able to be extended or retracted by changing the direction of current in the coil so as to drive the blocking piece to block or open the leakage hole, such that the call distortion condition can be improved and the high-frequency sound effect will not be reduced.

BRIEF DESCRIPTION OF THE DRAWINGS

To clearly expound the technical solution of the present invention, the drawings and embodiments are hereinafter combined to illustrate the present invention. Obviously, the drawings are merely some embodiments of the present invention and those skilled in the art can associate themselves with other drawings without paying creative labor.

DETAILED DESCRIPTION OF THE INVENTION

Figure 1:
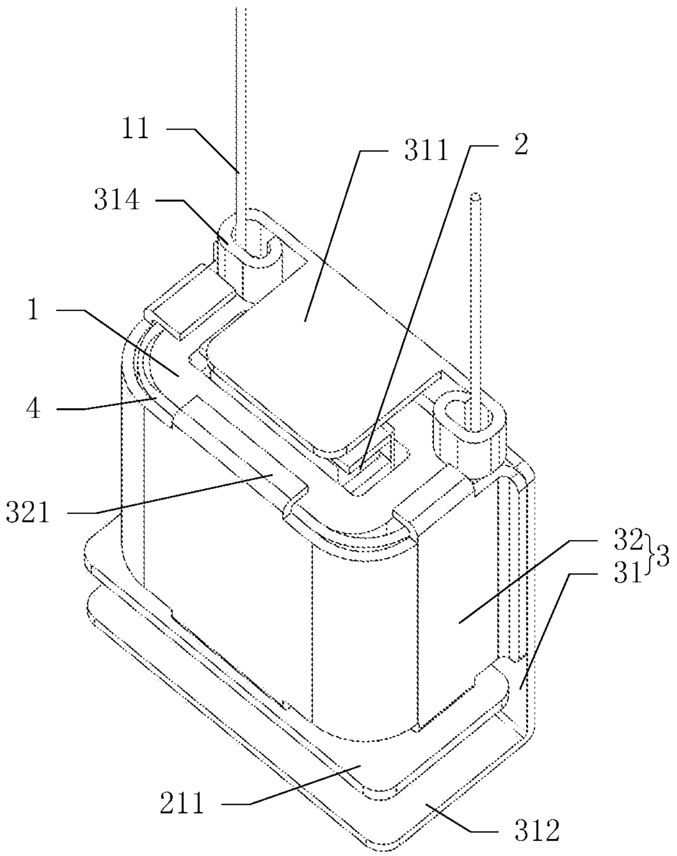
FIG. 1 is a three-dimensional diagram of the linear movement bistable electromagnetic switch of the present invention.

Drawings and detailed embodiments are combined hereinafter to elaborate the technical principles of the present invention.

As shown in FIGS. 1-4, the present invention provides a linear movement bistable electromagnetic switch, which comprises a coil 1, a magnetic rotor 2 movably disposed in an inner hole of the coil 1, a shell 3 which wraps around the outer side surface of the coil 1, and an insulating layer 4 disposed between the coil 1 and the shell 3. The magnetic rotor 2 is able to move under the effect of a magnetic field generated after the coil is energized. One end of the magnetic rotor 2 extends out of the coil 1 and is connected to a blocking piece 211 for opening/closing a loudspeaker leakage hole.

The structure of the electromagnetic switch of the present invention is simple and reliable. The electromagnetic switch is installed in a mobile phone, and the blocking piece 211 directly faces the leakage hole in the sound cavity of the loudspeaker. When the mobile phone is in multimedia mode, the electromagnetic switch is energized to enable the magnetic rotor 2 to extend out, thereby driving the blocking piece 211 to block the leakage hole. Thus, the high-frequency sound effect of the loudspeaker can be prevented from being reduced. When the mobile phone is switched to a talk mode, the direction of the current in the coil is changed so that the magnetic rotor is enabled to retract, thereby driving the blocking piece 211 to open the leakage hole. Thus, the low-frequency distortion condition of the loudspeaker can be improved.

Figure 3:
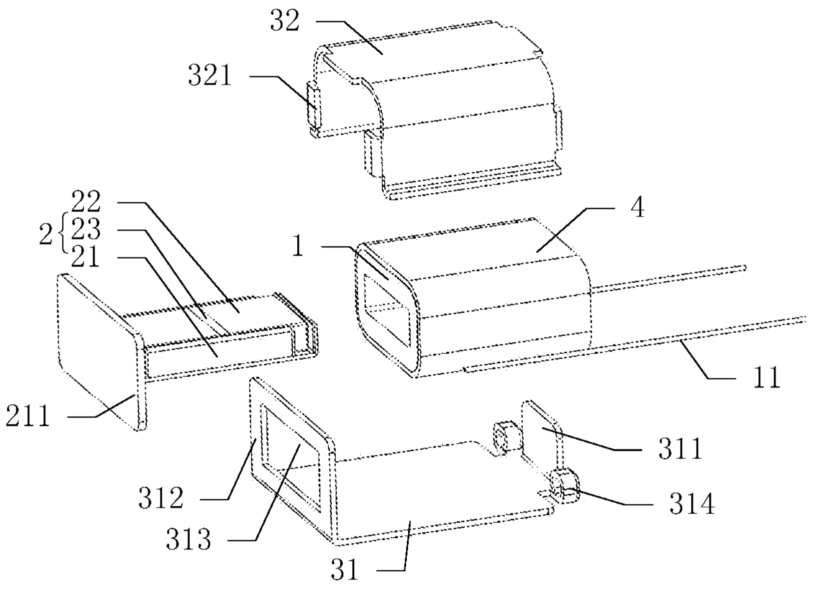
FIG. 3 is a structural diagram of the linear movement bistable electromagnetic switch of the present invention.

Specifically, as shown in FIG. 3, the shell 3 comprises a base iron sheet 31 and a metal half-shell 32 connected with the base iron sheet 31. The two ends of the base iron sheet 31 are respectively provided with a first folding edge 311 and a second folding edge 312 that are perpendicular to the moving direction of the magnetic rotor 2. Gaps are formed between the first folding edge and the two ends of the magnetic rotor 2, and between the second folding edge and the two ends of the magnetic rotor 2. A through hole 313 is formed in the second folding edge 312 close to the blocking piece 211. The first folding edge 311 and the second folding edge 312 are used for limiting the magnetic rotor, thus preventing the magnetic rotor 2 from falling off from the coil 1 during transportation and use. Moreover, when being stressed to move, the magnetic rotor 2 is attached to the first folding edge 311 or the second folding edge 312 under the action of its own magnetic force. Therefore, it's unnecessary to maintain the opening/closing state through a continuous current. During use, it merely requires the introduction of a pulse current for changing the opening/closing state, greatly saving the power of the mobile phone, and effectively prolonging the functional life of the electromagnetic switch.

Figure 4:
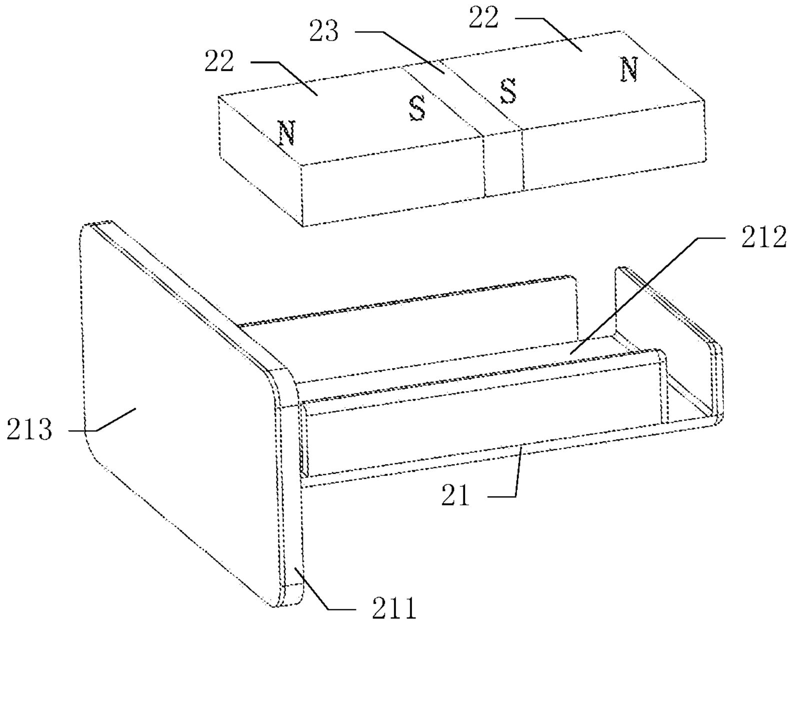
FIG. 4 is a structural diagram of the magnetic rotor in the linear movement bistable electromagnetic switch of the present invention.

Furthermore, as shown in FIGS. 3-4, the magnetic rotor 2 comprises a magnet fixing base 21 that is provided with a fixing groove 212, and two permanent magnets 22 that are installed in the fixing groove 212 and face each other with the same pole (either S pole or N pole). A shielding block 23 is connected between the two permanent magnets 22, and the blocking piece 211 is fixed at one end of the magnet fixing base 21. The shielding block 23 can be made of iron or other materials with larger magnetic conductivity. In fact, the magnet cannot move if it is wholly placed in the inner hole of the coil, for the forces borne by the two ends of the magnet are always equal and in opposite directions. In the present invention, the shielding block exerts a shielding function at one end of the permanent magnet connected with the shielding block, thereby reducing the acting force between the face-to-face ends of the two magnets and the outer magnetic field (the magnetic field of the coil). In such circumstances, for the back-to-back ends of the two magnets are slightly influenced, the axial force borne by the back-to-back ends is greater than that borne by the face-to-face ends. Furthermore, for the polarities of the face-to-face ends are the same, the stress directions are also the same. Thus, the total axial force borne by the magnetic rotor is not zero so that the movement of the magnetic rotor under the magnetic field can be achieved.

In this embodiment, as shown in FIG. 4, a sealing pad 213 is arranged on the blocking piece 211. The sealing pad can be a sponge pad, a leather pad, a felt pad or other pads with an air sealing effect. Through the arrangement of the sealing pad, air leakage in the sound cavity of the loudspeaker in the closing state can be prevented, ensuring that the high-frequency sound effect of the loudspeaker is not reduced in the closing state.

Moreover, a gap not greater than 0.05 mm is formed between the magnetic rotor 2 and the inner hole wall of the coil 1. In this embodiment, the length, the width and the height of the electromagnetic switch are not greater than 7 mm, 6 mm and 3 mm respectively. The gap between the magnetic rotor and the inner hole wall of the coil is within the aforesaid range, which enables the magnetic rotor to fully occupy the inner space of the coil so that the electromagnetic force can be improved, and allows the magnetic rotor to move smoothly.

Specifically, when the magnetic rotor 2 retracts, the distance between the blocking piece 211 and the second folding edge 312 is 0.5-2 mm. Preferably, the distance is 1 mm. This distance not only prevents the air in the sound cavity of the loudspeaker from being blocked in the opening state, thus avoiding the low-frequency distortion, but realizes a compact structure of the electromagnetic switch so that a smaller space occupation can be achieved.

Figure 2:
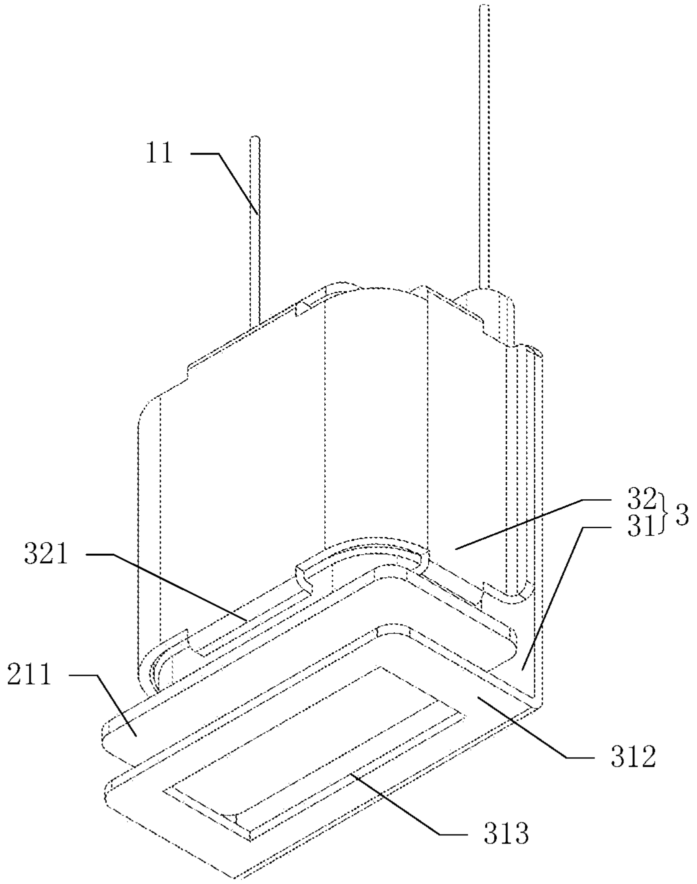
FIG. 2 is another three-dimensional diagram of the linear movement bistable electromagnetic switch of the present invention.

As shown in FIGS. 1-3, in order to prevent the coil 1 from falling off from the shell 3, a plurality of fixing folding pieces 321 is arranged at the two ends of the metal half-shell 32.

In this embodiment, the insulating layer 4 is made of insulating paper, which can also be made of insulating glue, insulating paint or other insulating materials.

Additionally, as shown in FIGS. 1-3, the positions located on the two sides of the root of the first folding edge 311 on the base iron sheet 31 are respectively provided with a pin positioning ring 314 for fixing a coil pin 11. Through the arrangement of the pin positioning ring, the internal structure of the coil can be protected from being damaged when the coil bears a pulling force.

The present invention provides a linear movement bistable electromagnetic switch, which comprises a coil, a magnetic rotor movably disposed in an inner hole of the coil, a shell which wraps an outer side surface of the coil and an insulating layer disposed between the coil and the shell. The magnetic rotor is able to move under the effect of a magnetic field generated after the coil is energized. One end of the magnetic rotor extends ort of the coil and is connected to a blocking piece for opening/closing a loudspeaker leakage hole. The magnetic rotor is able to be extended or retracted by changing the direction of current in the coil so as to drive the blocking piece to block or open the leakage hole, such that the call distortion condition can be improved and the high-frequency sound effect will not be reduced.

Furthermore, through the first folding edge and the second folding edge, the electromagnetic switch no longer needs to maintain the opening/closing state through a continuous current, greatly saving the power of the mobile phone, and effectively prolonging the functional life of the electromagnetic switch. The sealing pad arranged on the blocking piece can prevent the air leakage in the sound cavity of the loudspeaker in the closing state, ensuring that the high-frequency sound effect of the loudspeaker will not be reduced in the closing state. Moreover, through the reasonable design of the distance between the blocking piece and the second folding edge, the air flow in the sound cavity of the loudspeaker becomes unblocked, and the space occupation of the electromagnetic switch can be reduced. Through the pin positioning ring, the internal structure of the coil can be protected from being damaged when the coil pin bears a pulling force.

The description of above embodiments allows those skilled in the art to realize or use the present invention. Without departing from the spirit and essence of the present invention, those skilled in the art can combine, change or modify correspondingly according to the present invention. Therefore, the protective range of the present invention should not be limited to the embodiments above but conform to the widest protective range which is consistent with the principles and innovative characteristics of the present invention. Although some special terms are used in the description of the present invention, the scope of the invention should not necessarily be limited by this description. The scope of the present invention is defined by the claims.

The invention claimed is:

1. A linear movement bistable electromagnetic switch, comprising:

a coil, a magnetic rotor movably disposed in an inner hole of the coil, a shell which wraps an outer side surface of the coil, and an insulating layer disposed between the coil and the shell, wherein the magnetic rotor is able to move under the effect of a magnetic field generated after the coil is energized, wherein one end of the magnetic rotor extends out of the coil and is connected to a blocking piece for opening/closing a loudspeaker leakage hole.

2. The linear movement bistable electromagnetic switch of claim 1, wherein the shell comprises a base iron sheet and a metal half-shell connected with the base iron sheet, wherein the two ends of the base iron sheet are respectively provided with a first folding edge and a second folding edge that are perpendicular to the moving direction of the magnetic rotor, wherein gaps are formed between the first folding edge and the two ends of the magnetic rotor, and between the second folding edge and the two ends of the magnetic rotor, wherein a through hole is formed in the second folding edge close to the blocking piece.

3. The linear movement bistable electromagnetic switch of claim 1, wherein the magnetic rotor comprises a magnet fixing base that is provided with a fixing groove, and two permanent magnets that are installed in the fixing groove and face each other with the same pole, wherein a shielding block is connected between the two permanent magnets, and the blocking piece is fixed at one end of the magnet fixing base.

4. The linear movement bistable electromagnetic switch of claim 3, wherein the material of the shielding block is iron.

5. The linear movement bistable electromagnetic switch of claim 1, wherein a sealing pad is arranged on the blocking piece.

6. The linear movement bistable electromagnetic switch of claim 1, wherein a gap not greater than 0.05 mm is formed between the magnetic rotor and the inner hole wall of the coil.

7. The linear movement bistable electromagnetic switch of claim 2, wherein when the magnetic rotor retracts, the distance between the blocking piece and the second folding edge is 0.5-2 mm.

8. The linear movement bistable electromagnetic switch of claim 2, wherein a plurality of fixing folding pieces is arranged at the two ends of the metal half-shell.

9. The linear movement bistable electromagnetic switch of claim 1, wherein the insulating layer is an insulating paper.

10. The linear movement bistable electromagnetic switch of claim 2, wherein the positions located on the two sides of the root of the first folding edge on the base iron sheet are respectively provided with a pin positioning ring for fixing a coil pin.

11. The linear movement bistable electromagnetic switch of claim 2, wherein a sealing pad is arranged on the blocking piece.

12. The linear movement bistable electromagnetic switch of claim 3, wherein a sealing pad is arranged on the blocking piece.

13. The linear movement bistable electromagnetic switch of claim 4, wherein a sealing pad is arranged on the blocking piece.

* * * * *